(12) United States Patent
Zhao (10) Patent No.: US 11,436,119 B1
(45) Date of Patent: Sep. 6, 2022

(54) SYSTEM AND METHOD FOR IDENTIFYING AT-RISK USERS OF A DATA MANAGEMENT SYSTEM AND PROVIDING PERSONALIZED ATTENTION TO THOSE USERS

(71) Applicant: Intuit Inc., Mountain View, CA (US)

(72) Inventor: Runhua Zhao, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 599 days.

(21) Appl. No.: 16/422,491

(22) Filed: May 24, 2019

(51) Int. Cl.
  *G06F 3/048* (2013.01)
  *G06F 11/34* (2006.01)
  *G06N 3/04* (2006.01)
  *G06F 3/06* (2006.01)
  *G06N 3/08* (2006.01)

(52) U.S. Cl.
  CPC ........ *G06F 11/3438* (2013.01); *G06F 3/0605* (2013.01); *G06F 3/067* (2013.01); *G06F 3/0658* (2013.01); *G06N 3/049* (2013.01); *G06N 3/08* (2013.01)

(58) Field of Classification Search
  CPC .. G06F 11/3438; G06F 3/0605; G06F 3/0658; G06F 3/067; G06N 3/049; G06N 3/08
  See application file for complete search history.

(56) References Cited

U.S. PATENT DOCUMENTS

| | | | |
|---|---|---|---|
| 8,825,513 B1* | 9/2014 | Misra ................. | G06Q 10/0635 705/7.28 |
| 2005/0193414 A1* | 9/2005 | Horvitz .............. | H04N 21/4335 725/46 |
| 2013/0173637 A1* | 7/2013 | Kim ....................... | G06Q 30/02 707/748 |
| 2016/0247239 A1* | 8/2016 | Houseworth ........ | G06Q 40/123 |
| 2018/0197428 A1* | 7/2018 | Baphna .................... | G09B 7/00 |
| 2019/0114537 A1* | 4/2019 | Wesolowski ........... | G06N 3/084 |
| 2020/0082928 A1* | 3/2020 | Wu ......................... | G16H 80/00 |
| 2021/0004370 A1* | 1/2021 | Sekharan ............ | G06F 16/2455 |
| 2021/0256366 A1* | 8/2021 | Zhao ........................ | G06N 3/08 |

* cited by examiner

*Primary Examiner* — Rashawn N Tillery
(74) *Attorney, Agent, or Firm* — Paradice and Li LLP (57) ABSTRACT

A data management system predicts whether users will continue using the data management system. The data management system includes an analysis model that generates user retention prediction data based on time dependent user data and static user data. The analysis model also generates recommended actions to be taken by the data management system to increase the probability of retaining the user.

20 Claims, 7 Drawing Sheets

SYSTEM AND METHOD FOR IDENTIFYING AT-RISK USERS OF A DATA MANAGEMENT SYSTEM AND PROVIDING PERSONALIZED ATTENTION TO THOSE USERS

BACKGROUND

Millions of people turn to electronic data management systems for assistance in managing various kinds of data. Electronic data management systems represent a potentially efficient and convenient way to manage data of many kinds. For example, millions of people turn to data management systems for assistance with tax return preparation, bookkeeping, accounting, and transaction monitoring.

In spite of the potential benefits of electronic data management systems, traditional data management systems have struggled to retain users or to convert trial users into paying users. One reason for this historical struggle is that traditional data management systems have typically presented static user experiences that are the same for all users. These static user experiences may be suitable for some users, but many users find that their individual needs are not met by the traditional data management systems.

To combat this issue some data management systems have sought to utilize machine learning techniques to understand which users are at risk of abandoning the data management systems. Using traditional machine learning models, data management systems have had some success predicting whether users will abandon the data management system during a fixed time period, such as within 90 days since signup. These predictions are not able to account for various categories of users or the reasons that cause them to abandon the data management systems because they are not able to take into account or understand how the sequence actions during individual time periods affects a decision to leave the data management system. For example, these predictions are not able to take into account driving factors such as first-time users being confused about features of the data management systems or existing users abandoning the data management system because their own businesses have closed.

Due to the fact that traditional machine learning techniques have not provided insight into the factors that cause user attrition, the data management systems have not been able to efficiently and effectively identify actions that can be taken by the data management systems to increase the likelihood of retention for individual users. As a result, traditional data management systems are unable to take meaningful personalized steps that will increase the likelihood that individual users will continue with the data management systems and remain or become paying customers. The result is that many users continue to receive unsatisfying user experiences.

When users do not receive satisfactory user experiences, both the data management system and the users can face adverse consequences. Some users may become frustrated and confused and may abandon the data management system. Other users may access a search feature of the data management system, thereby causing the data management system to spend large amounts of computing resources, such as processor cycles, memory, and time performing searches for assistance topics based on the search terms entered by the users. Still other users may decide to make a telephone call to the data management system and speak with an expert in a process that can be very expensive and time consuming to both the data management system operators and to the users.

All of these drawbacks are a result of the technical inability of the traditional data management systems to properly understand the individual needs of the users. Accordingly, there exists a technical problem of identifying users that are at risk of abandoning a data management system and taking personalized steps to improve the experience for those users.

What is needed is a system and method that can provide a technical solution to the technical problem of accurately identifying at risk users of a data management system and taking individualized actions to meet the needs of those users.

SUMMARY

A data management system predicts whether users are likely to abandon or continue with the data management system over a defined period of time. The data management is able to do this with increased accuracy compared to past systems, in part, because the data management system analyzes the behavior of users during each of a selected number of previous time periods. Machine learning is then used to accurately predict whether a user will abandon or continue with the data management system during the selected future time period based on the behavior of the user during each of the previous periods of time, as well as based on the profile of the user. The analysis of the user activity during a sequence of time periods enables the data management system make more accurate predictions, and to make predictions about any selected future time period. In addition, the system predicts what actions should be taken by the data management system to increase the likelihood of retaining an individual user based on the past behavior and profile of the user.

The data management system uses machine learning techniques to predict whether users are likely to abandon or continue with the data management system in any selected future period of time. The data management system analyzes, with a machine learning process, the behavior of users during each of a selected number of previous time periods. The machine learning process trains an analysis model to accurately predict whether a user will abandon or continue with the data management system during the selected future time period based on the behavior of the user during each of the previous periods of time, as well as based on the static characteristics of the user. The machine learning process also trains the analysis model to predict what actions should be taken by the data management system to increase the likelihood of retaining an individual user based on the past behavior and static characteristics of the user.

During the machine learning process, the behavior of the user for each previous time period is represented by a respective vector and fed into a recurrent neural network. The recurrent neural network processes the vectors and generates a series of processed vectors. The processed vectors, as well as static vectors that represent the static characteristics of the user, are passed to a deep learning cross network that concatenates the processed vectors with the static vectors and then further processes the concatenated vectors. The deep learning cross network then outputs a prediction regarding whether the user is likely to abandon or continue with the data management system during a selected time period. The machine learning process trains the recurrent neural network and the deep learning cross network to predict attrition and to predict what steps should be taken to retain a user. The data management system then takes the recommended actions to retain the user.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Figure 1:
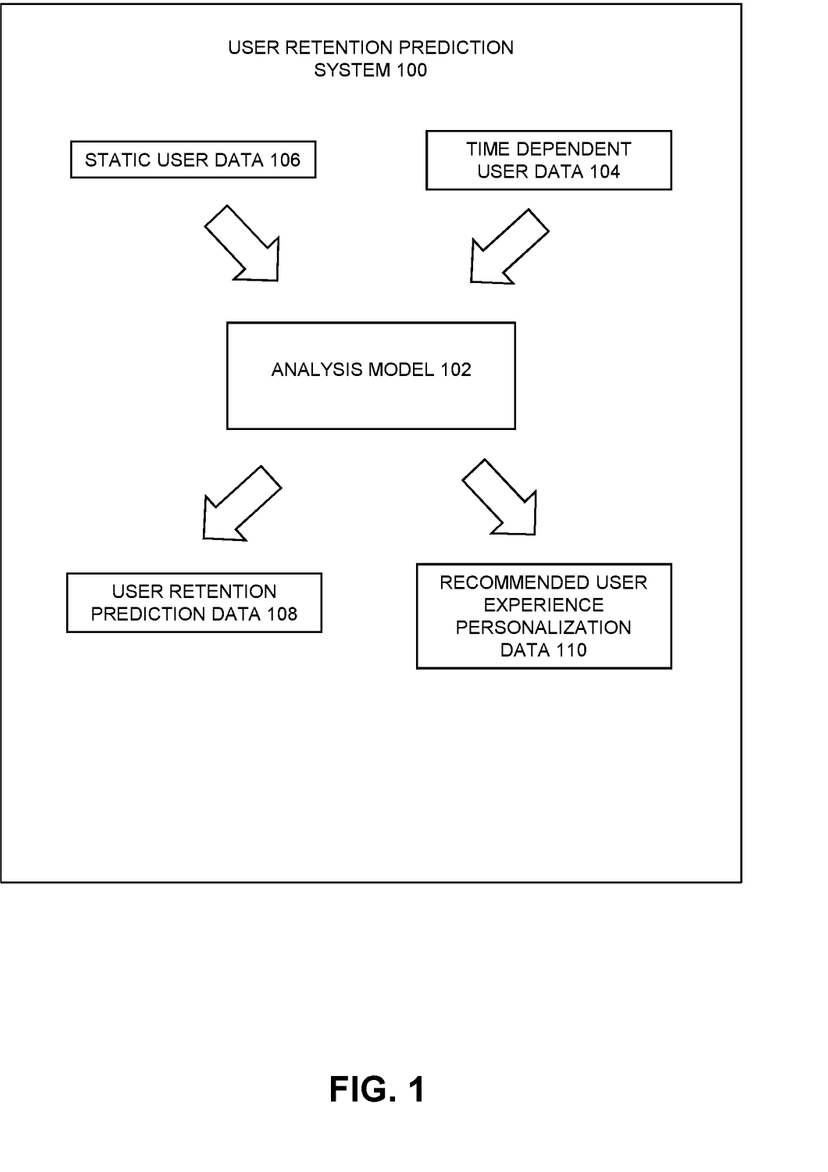
FIG. 1 is a block diagram of a system for predicting retention of users of a data management system, in accordance with one embodiment.

FIG. 1 is a high level block diagram of the user retention prediction system 100, according to an embodiment. The user retention prediction system 100 is implemented to assist the data management system to understand whether users are likely to continue with or abandon the data management system. The user retention prediction system 100 is also implemented to assist the data management system in determining what actions can be taken by the data management system in order to increase the likelihood that individual users will remain with the data management system.

The data management system is a system that assists users to manage their data. The data management system can include one or more of a bookkeeping system, a tax return preparation system, or a personal transaction monitoring system.

It is beneficial for the data management system to retain as many users as possible. In some cases, users of the data management system may pay a periodic fee to access the products and services of the data management system. In some cases, the data management system may offer users a free trial in which the users can utilize the services of the data management system before making the decision to become a paying user of the data management system. In either of these cases, it is beneficial for the data management system to provide a personalized and delightful user experience in order to retain currently paying users, and to convert trial users to paying users.

The user retention prediction system 100 includes an analysis model 102 that assists the data management system to retain currently paying users and to convert trial users into paying users. The analysis model 102 receives multiple types of user data and then analyzes the user data. The analysis model 102 then makes predictions about whether the users are likely to remain paying users or become paying users and whether there are actions that can be taken by the data management system that will increase the likelihood that users will remain or become paying users.

The analysis model 102 receives, for each user, time dependent user data 104 and static user data 106. The analysis model 102 analyzes the time dependent user data 104 and the static user data 106. The user retention prediction system 100 generates user retention prediction data 108 and recommended user experience personalization data 110 based on analysis of the time dependent user data 104 and the static user data 106.

The time dependent user data 104 can include, for a given user, data regarding actions that have been taken by the user within the data management system in various periods of time. The actions can include processes that the user has completed with the data management system and clickstream data indicating selections made by the user while navigating the data management system. The time dependent user data 104 is divided into blocks of data corresponding to different periods of time. The data for each period of time indicates the actions taken by the user during that period of time. This data is fed into the analysis model 102.

In one example the data management system is a bookkeeping system. In this case, the time dependent user data 104 for a user can include whether or not the user has created an invoice, whether the user has received an invoice, whether the user has added expenses, whether the user has made payments, whether the user has received payments, or whether the user has called customer support to receive assistance related to the data management system, to name only a few of the possible actions that can be included and recorded. The block of data for each period of time has an indication of whether these actions or events have occurred during that period of time.

The static user data 106 can include, for a given user, types of data about the user that do not typically change regardless of the time period being considered, though this does not mean that these types of data never change. The static user data 106 can include the kinds of data that are provided by the user to the data management system when the user signs up or registers with the data management system. The static user data 106 can also include the kinds of data that the data management system identifies and records about the user when the user signs up or registers with the data management system. The static user data 106 can also be various forms of profile data.

In the example in which the data management system is a bookkeeping system, the static user data 106 can include a type of business associated with the user, the specific product or service of the bookkeeping system to which the user is subscribed, whether the user migrated to the current product or service of the bookkeeping system from a different product or service of the bookkeeping system, a location associated with the user, whether the user is currently a paying user, whether the user is a trial user, or demographics data associated with the user.

The analysis model 102 utilizes both the time dependent user data 104 and the static user data 106 in various analysis processes. For example, the analysis model 102 can analyze the time dependent user data with a first process. The analysis model 102 can then analyze both the time dependent user data 104 and the static user data 106 in a second process. The analysis model 102 may further analyze both the time dependent user data 104 and the static user data 106 in various further processes. Specific examples of these processes are disclosed in more detail below.

The analysis model 102 ultimately generates user retention prediction data 108 based on the time dependent user data 104 and the static user data 106. The user retention prediction data 108 can include a prediction as to whether a trial user will become a paying user at a selected future time period based on the time dependent user data 104 from the various preceding time periods. The user retention prediction data 108 can include a prediction as to whether the currently paying user will still be a paying user at a selected future time, based, in part, on the time dependent user data 104 from the various preceding time periods.

The user retention prediction data 108 can also include a lifetime value prediction for a user. The lifetime value prediction indicates the likely total value of the user to the data management system over the lifetime of the user. The lifetime value prediction can indicate a likely monetary value or range of monetary values that represent the predicted total value of the user to the data management system over the lifetime of the user. Alternatively, or additionally, the lifetime value prediction can simply predict a general category of value of the user, such as low value, medium value, or high value. The lifetime value prediction can also be useful prioritizing the retention of users that are likely to have a high lifetime value.

The analysis model 102 also ultimately generates recommended user experience personalization data 110 based on the time dependent user data 104 and the static user data 106. The recommended user experience personalization data 110 includes recommendations of actions that the data management system could take to increase the probability that a user will become or remain a paying user at a selected future period of time. The recommended user experience personalization data 110 can also include a recommendation as to whether the data management system should take any action at all in an effort to convert or retain the user.

In the example in which the data management system is a bookkeeping system, the recommended user experience personalization data 110 can include actions that are selected to improve the probability of retaining or converting the user. Possible recommended actions can include sending an email to the user, prompting the user to try a particular feature of the bookkeeping system, offering the user a discounted or promotional rate, recommending the user add a mobile bookkeeping application associated with the bookkeeping system, or recommending the user visit a website of the bookkeeping system. The action can also include selecting a different user interface or user interface style for the user.

The analysis model 102 can generate recommended user experience personalization data 110 based, in part, on the user retention prediction data 108. For example, if the lifetime value prediction of the user is low, the recommended user experience personalization data 110 may include a recommendation to take no action at all, or to provide a discount. If the lifetime value prediction for the user is medium, then the recommended user experience personalization data 110 can be selected to accelerate conversion or to prevent attrition. If the estimated lifetime value prediction for the user is high, then the recommended user experience personalization data 110 can include proposing an action selected to accelerate conversion, or taking no action at all.

The analysis model 102 is trained with one or more machine learning processes. Before the analysis model 102 is used to generate user retention prediction data 108 and the recommended user experience personalization data 110, the analysis model 102 is trained with the machine learning process to accurately generate the user retention prediction data 108 and the recommended user experience personalization data 110. The machine learning processes utilize historical user data that includes time dependent user data broken up into periods of time and static user data. Machine learning processes also include labels indicating whether the historical users remained paying customers or became converted at selected dates subsequent to the historical time dependent user data time periods. The machine learning processes are described in further detail below.

The analysis model 102 is able to generate the recommended user experience personalization data 110 based on sensitivity analysis of the time dependent user data 104. The machine learning training process teaches the analysis model 102 the relationships between various items of time dependent user data and static user data. The sensitivity analysis introduces perturbations or changes into the time dependent user data. After each perturbation, the user retention prediction data 108 is generated. A perturbation or change that increases the retention or conversion likelihood is an indication as to what would need to change for the user to increase the likelihood that the user will convert or be retained. The analysis model 102 then generates recommended user experience personalization data 110 based on the sensitivity analysis.

Figure 2:
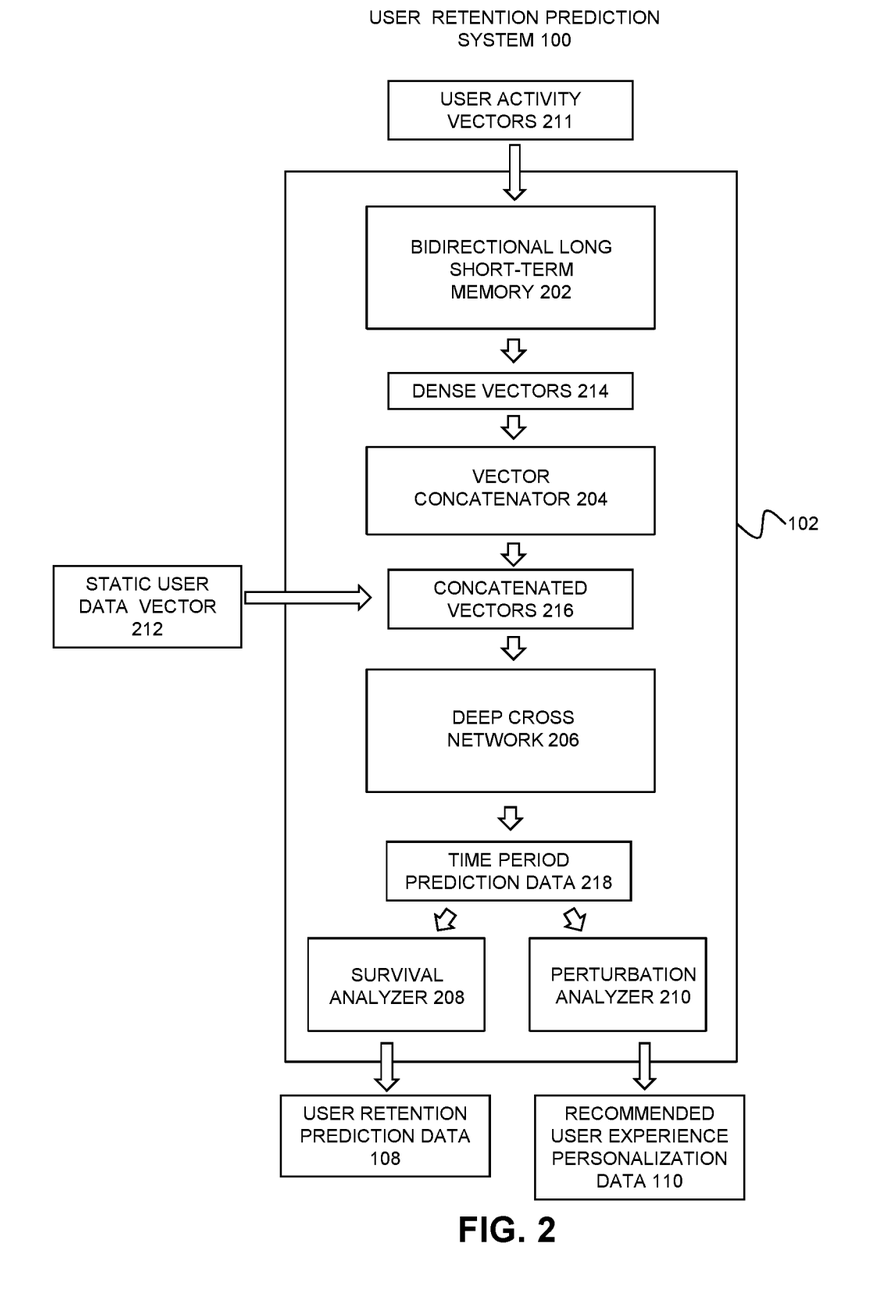
FIG. 2 is a block diagram of a system for predicting retention of users of a data management system, in accordance with one embodiment.

FIG. 2 is a block diagram of a user retention production system 100, according to an embodiment. The user retention prediction system 100 utilizes an analysis model 102 to generate predictions regarding user retention and conversion and to recommend actions to be taken to improve the probability that users will remain or convert to paying customers. The analysis model 102 generates the retention predictions and predictive actions based on time dependent user data 104 and static user data 106 that have been formatted in a particular manner.

The analysis model 102 includes a bidirectional long short-term memory 202, a vector concatenator 204, a deep cross network 206, a survival analyzer 208, and a perturbation analyzer 210. The bidirectional long short-term memory 202, the vector concatenator 204, the deep cross network 206, the survival analyzer 208, and the perturbation analyzer 210 work together to generate user retention prediction data 108 and recommended user experience personalization data 110. The components of the analysis model 102 shown in FIG. 2 are given by way of example as one embodiment of an analysis model 102 that can generate user retention prediction data 108 and recommended user experience personalization data 110.

As will be discussed in more detail below, the analysis model 102 has been trained with a machine learning process. The machine learning process trains the bidirectional long short-term memory 202 and the deep cross network 206 to collectively generate user retention prediction data 108 and to enable the perturbation analyzer 210 to generate recommended user experience personalization data 110. Accordingly, the discussion of the analysis model 102 will proceed as though the analysis model 102 has already been trained with a machine learning process.

The analysis model 102 receives, as input, user activity vectors 211 and a static user data vector 212. The user activity vectors 211 corresponds to the time dependent user data 104 discussed in relation to FIG. 1, formatted and arranged in a selected manner. The static user data vector 212 corresponds to the static user data 106 discussed in relation to FIG. 1, formatted and arranged in a selected manner.

When the analysis model 102 is to generate user retention prediction data 108 and recommended user experience personalization data 110 for a given user of a data management system, the time dependent user data 104 is formatted as a series of vectors. The time dependent user data 104 corresponds to activities of the user performed during various time periods. The user activity vectors 211 include a separate user activity vector for each time period under analysis.

Figure 3:
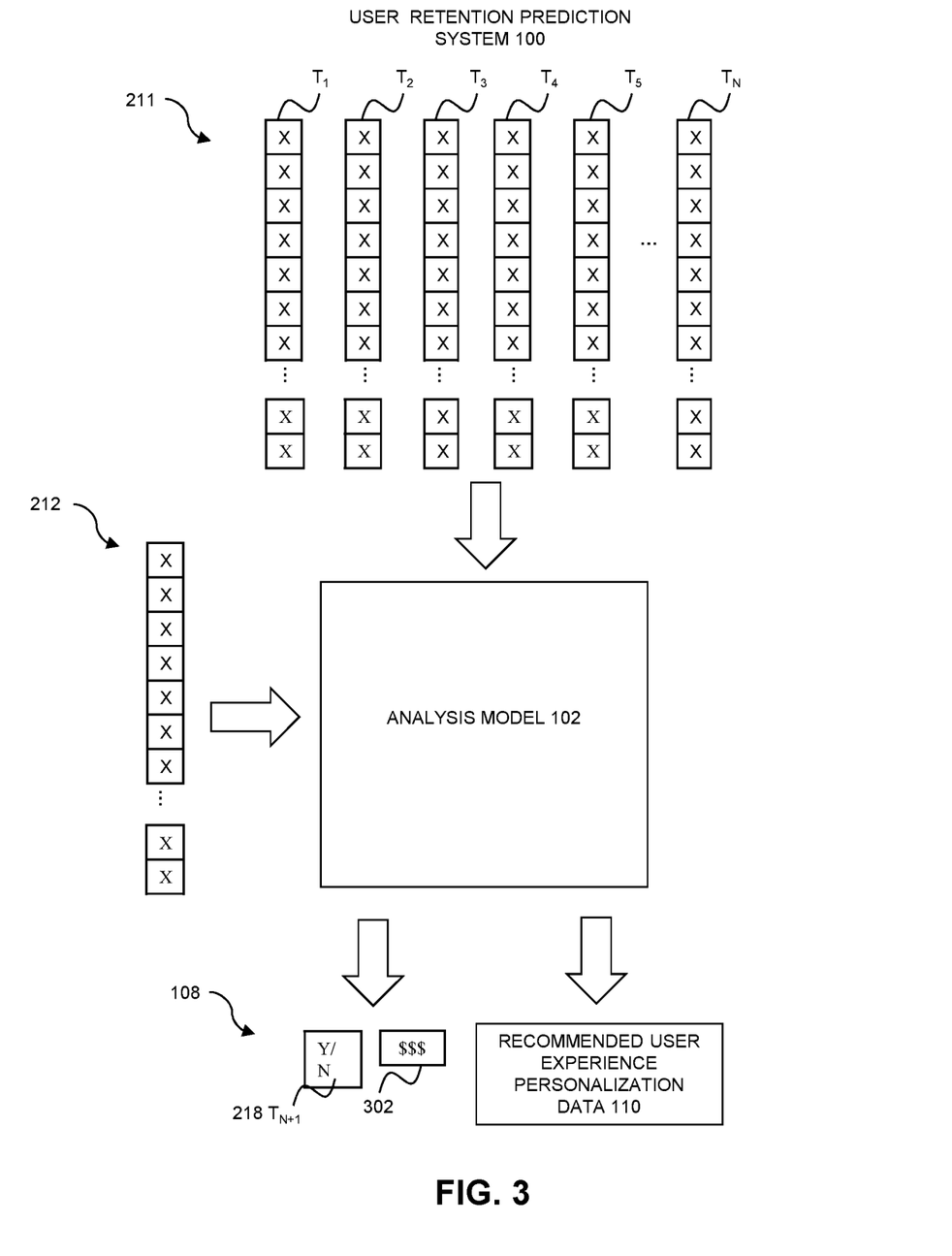
FIG. 3 is a block diagram of a system for predicting retention of users of a data management system, in accordance with one embodiment.

The user activity vectors 211 all include the same number of data fields. Each data field corresponds to a particular type of activity. The data value in the data field indicates whether or not that activity was performed or occurred for the user during the corresponding time period. Examples of user activity vectors 211 are shown in FIG. 3 and discussed in more detail below.

In the illustrative example of a bookkeeping system, the first data field in each user activity vector can indicate whether an invoice was created during the corresponding time period. The second data field in each user activity vector can indicate whether the user received a payment during the corresponding time period. Other data fields can correspond to whether the user received an invoice, whether the user added expenses, whether the user made payments, or whether the user has called customer support to receive assistance during the corresponding time period.

Due to the large number of possible activities that can occur, each user activity vector may have a very large number of data fields. The user activity vectors can have hundreds or even thousands of data fields. Typically, most of the activities represented by the data fields do not occur in any given time period. Accordingly, the user activity vectors 211 can be quite sparse, meaning that the vast majority of data fields in each user activity vector will hold a data value of 0. The sparsity of the user activity vectors 211 is dealt with by the analysis model 102, as will be described in more detail below.

The static user data vector 212 is a single vector having data fields that represent static characteristics of the user. In the illustrative example of a bookkeeping system, the data fields of the static user data vector 212 can indicate a type of business associated with the user, a specific product or service of the bookkeeping system to which the user is subscribed, whether the user migrated to the current product or service of the bookkeeping system from a different product or service of the bookkeeping system, a location associated with the user, whether the user is currently a paying user, whether the user is a trial user, or demographics data associated with the user.

The user activity vectors 211 are initially passed to the bidirectional long short-term memory 202. The bidirectional long short-term memory 202 is a type of recurrent neural network with multiple hidden layers. The bidirectional long short-term memory 202 is particularly suited for processing sequential data. Traditional long short-term memories are unidirectional in that they only process data in one direction. The bidirectional long short-term memory 202 processes data in two directions, from past to future and from future to past.

The bidirectional long short-term memory 202 includes two input layers. The first input layer receives the user activity vectors 211 beginning with the user activity vector representing the earliest time period and receives the user activity vectors in sequence until the user activity vector representing the latest time period has been processed. The second input layer receives the user activity vectors 211 in the opposite order as the first input layer. The second input layer first receives the user activity vector representing the most recent time period and receives the remaining user activity vectors in reverse sequence until the user activity vector representing the earliest time period has been received. In this way, the recurrent neural network is bidirectional.

The bidirectional long short-term memory 202 processes the user activity vectors 211 and generates dense vectors 214. The dense vectors have a significantly reduced number of data fields compared to the user activity vectors 211. The bidirectional long short-term memory 202 generates a dense vector for each period of time represented in the user activity vectors 211. If there are five user activity vectors 211 each representing one of five time periods, $T_1$-$T_5$, then the dense vectors 214 will include five vectors. The first dense vector represents user activity in time period $T_1$. The second dense vector represents user activity in time periods $T_1$-$T_2$. The third dense vector represents user activity in time periods $T_1$-$T_3$. The fourth dense vector represents user activity in time periods $T_1$-$T_4$. The fifth dense vector represents user activity in time periods $T_1$-$T_5$. The analysis model 102 utilizes these dense vectors to predict retention or conversion in future time periods $T_6$, $T_7$, $T_g$, as desired.

In one example, each time period can represent a single day. In this case the user activity vector for $T_1$ represents the activity of the user on day 1. The user activity vector for $T_2$ represents activity of the user on day two, and so forth. The user activity vectors can ultimately be utilized to predict retention or conversion on any future day or on many future days. For example, 30 days' worth of activity can be used to predict retention or conversion on day 31, on day 90, or on any day between or after. The time periods are not limited to single days. The time periods can represent any selected period of time. Thus, each time period can represent a week, two weeks, a month, etc.

After the bidirectional long short-term memory 202 has generated the dense vectors 214, the dense vectors 214 are passed to the vector concatenator 204. The static user data vector 212 is also passed to the vector concatenator 204. The vector concatenator 204 concatenates each dense vector with the static user data vector 212. The vector concatenator 204 generates concatenated vectors 216. Each concatenated vector represents a concatenation of a respective dense vector with the static user data vector 212. The concatenated vectors 216 are passed to the deep cross network 206. Alternatively, the vector concatenator 204 can be part of the deep cross network 206.

The deep cross network 206 includes a deep neural network and a cross-feature network. The deep neural network and the cross-feature network are arranged in parallel with each other. Both the deep neural network and the cross-feature network receive the concatenated vectors 216. Both the deep neural network and the cross-feature network process the concatenated vectors 216 and pass their respective output vectors to a combination output layer. The combination output layer receives the outputs of both the deep network and the cross network, and combines them, and generates time period prediction data 218.

The time period prediction data 218 corresponds to a prediction of retention or conversion at a selected time based on the analysis of the user activity vectors 211 from the previous time periods and the static user data vector 212. In the case that the user is currently a paying user, the time period prediction data 218 predicts whether that user will remain a paying user at the selected time period. In the case where the user is currently a trial user, the time period prediction data 218 predicts whether the trial user will have converted to be a paying user at the selected time period.

The output of the final combination layer of the deep cross network 206 is the time period prediction data 218. The combination of the deep neural network and the cross-feature network enables the deep cross network, during training, to learn the relationships between all of the features in the concatenated vectors 216. This enables the combination layer to make accurate predictions about user retention or user conversion at a selected future date. This further enables the analysis model 102 to generate the user retention prediction data 108 and the recommended user experience personalization data 110, based on perturbations, as will be explained in more detail below. The time period prediction data 218 can be part of the user retention prediction data 108. In one embodiment, the time period prediction data 218 is the final output of the analysis model 102.

The time period prediction data 218 is passed to both the survival analyzers 208 and the perturbation analyzer 210. The survival analyzer 208 processes the time period prediction data 218 and generates the user retention prediction data 108. The perturbation analyzer 210 processes the time period prediction data 218 and generates the recommended user experience personalization data 110.

The survival analyzer 208 receives the time period prediction data 218. The survival analyzer 208 can receive each prediction for each selected time. For example, the analysis model 102 can generate predictions for each of a plurality of selected time periods beyond the most recent time period corresponding to the most recent user activity vector. The survival analyzer 208 receives each of these predictions and combines them into a conditional cumulative probability prediction.

The conditional cumulative probability is a prediction or probability of whether the user will remain a paying customer in the long-term, or whether the user will convert to be a paying customer and remain a paying customer in the long-term. The survival analyzer 208 can take the conditional cumulative probability and generate a user lifetime value data. The lifetime value prediction indicates the likely total value of the user to the data management system over the lifetime of the user. The lifetime value prediction can indicate a likely monetary value or range of monetary values that represent the predicted total value of the user to the data management system over the lifetime of the user. Alternatively, or additionally, the lifetime value prediction can simply predict a general category of value of the user, such as low value, medium value, or high value. The user retention prediction data 108 can include the conditional cumulative probability prediction, the lifetime value prediction, and the time period prediction data 218.

In one embodiment, the survival analyzer 208 includes a sigmoid function. The sigmoid function receives, as inputs, the various retention/conversion predictions for particular time periods and sums them in order to determine the lifetime retention/conversion prediction and the lifetime value prediction.

The perturbation analyzer 210 receives the time period prediction data 218 from the deep cross network 206. The perturbation analyzer 210 utilizes the analysis model 102 to determine whether there are individual changes in the user activity that would result in a higher probability of retention or conversion in the time period prediction data 218. The perturbation analyzer 210 accomplishes this by introducing perturbations into the user activity vectors 211. The perturbation analyzer 210 changes an attribute in the user activity vectors 211 and the passes the perturbed user activity vectors through the analysis model 102. The user activity vectors are then provided to the bidirectional long short-term memory 202, the dense vectors 214 are generated, the dense vectors 214 are concatenated with the static user data vector 212, the concatenated vectors 216 are passed to the deep cross network 206, and the deep cross network 206 generates the time period prediction data 218 based on the perturbed user activity vectors. The time period prediction data 218 that is generated based on the perturbed user activity vectors can be termed adjusted time period prediction data, or adjusted user retention prediction data.

The perturbation analyzer 210 introduces a series of perturbations, iteratively, into the user activity vectors. The perturbation or perturbations that result in the largest increase in the retention or conversion probability as indicated in the time period prediction data 218 are stored by the perturbation analyzer 210, or by another component of the analysis model 102. The analysis model 102 then determines what actions can be taken by the data management system to encourage these changes. These actions correspond to the recommended user experience personalization data 110.

The recommended user experience personalization data 110 can include recommended actions to be taken by the data management system to encourage change in behavior in the user that will result in an increase probability of the user remaining a paying customer or becoming a paying customer. In the illustrative example in which the data management system is a bookkeeping system, the recommended user experience personalization data 110 can include actions that are selected to improve the probability of retaining or converting the user. Possible recommended actions can include sending an email to the user, prodding the user to try a particular feature of the bookkeeping system, offering the user a discounted or promotional rate, recommending the user add a mobile bookkeeping application associated with the bookkeeping system, or recommending the user visit a website of the bookkeeping system. The action can also include selecting a different user interface or user interface style for the user.

The analysis model 102 can generate recommended user experience personalization data 110 based, in part, on the user retention prediction data 108. For example, if the lifetime value prediction of the user is low, the recommended user experience personalization data 110 may include a recommendation to take no action at all, or to provide a discount. If the lifetime value prediction for the user is medium, then the recommended user experience personalization data 110 can be selected to accelerate conversion or to prevent attrition. If the estimated lifetime value prediction for the user is high, then the recommended user experience personalization data 110 can include proposing an action selected to accelerate conversion, or taking no action at all. For high value users, more expensive actions may be taken, such as making a personal phone call to the user to address potential concerns.

FIG. 3 is a block diagram of a user retention prediction system 100, according to an embodiment. The block diagram of FIG. 3 illustrates the user activity vectors 211 being passed to the analysis model 102. There are N user activity vectors 211 each representing the activity of the user with the data management system during a respective period of time $T_{1-N}$. Thus, there are N periods of time in the example FIG. 3.

Each of the data fields represents a particular type of activity or action that can occur in relation to an account of the user with the data management system during a given period of time. As set forth above, in an example in which the data management system is a bookkeeping system, the first data field in each user activity vector can indicate whether an invoice was created during the corresponding time period. The second data field in each user activity vector can indicate whether the user received a payment during the corresponding time period. Other data fields can correspond to whether the user received an invoice, whether the user added expenses, whether the user made payments, or whether the user has called customer support to receive assistance during the corresponding time period. A final data field may indicate whether or not the user is a paying during a given period of time.

Each user activity vector has the same number of data fields. The order of the actions represented by the data fields data fields is the same for each user activity vector. Each user activity vector may be dozens or hundreds of data fields in length. While the data fields of the user activity vectors 211 are populated with data values of X in FIG. 3, in practice, each data field may be populated with 0 or 1. In some cases, the user activity vectors 211 may include values other than 0 or 1.

The static user data vector 212 is also fed into the analysis model 102. The static user data vector 212 is a single vector having data fields that represent static characteristics of the user. In the example of a bookkeeping system, data fields of the static user data vector 212 can indicate a type of business associated with the user, a specific product or service of the bookkeeping system to which the user is subscribed, whether the user migrated to the current product or service of the bookkeeping system from a different product or service of the bookkeeping system, a location associated with the user, whether the user is currently a paying user, whether the user is a trial user, or demographics data associated with the user.

The analysis model 102 receives the user activity vectors 211 and the static user data vector 212 and generates user retention prediction data 108 as described in relation to FIGS. 1 and 2. The user retention prediction data 108 can include time period prediction data 218. The time period prediction data 218 predicts whether the user will remain or become a paying customer at a selected period of time. In the example of FIG. 3, the selected period of time is $T_{N+1}$, the period of time directly following the time period $T_N$ of the most recent user activity vector. In practice, the analysis model 102 may output a series of time period predictions for various per periods of time following $T_N$. The time period prediction data 218 can correspond to a simple "yes" or "no" prediction. Alternatively, the time period prediction data 218 can be a probability having a value between 0 and 1.

The user retention prediction data 108 can also include a user lifetime value data 302. The user lifetime value data 302 can include a monetary value, a range of monetary values, or a simple category such as low, medium, or high value.

The analysis model 102 can also generate the recommended user experience personalization data 110, as described in relation to FIGS. 1 and 2. The recommended user experience personalization data 110 can be generated with the perturbation analyzer, as described in relation to FIG. 2.

Figure 4:
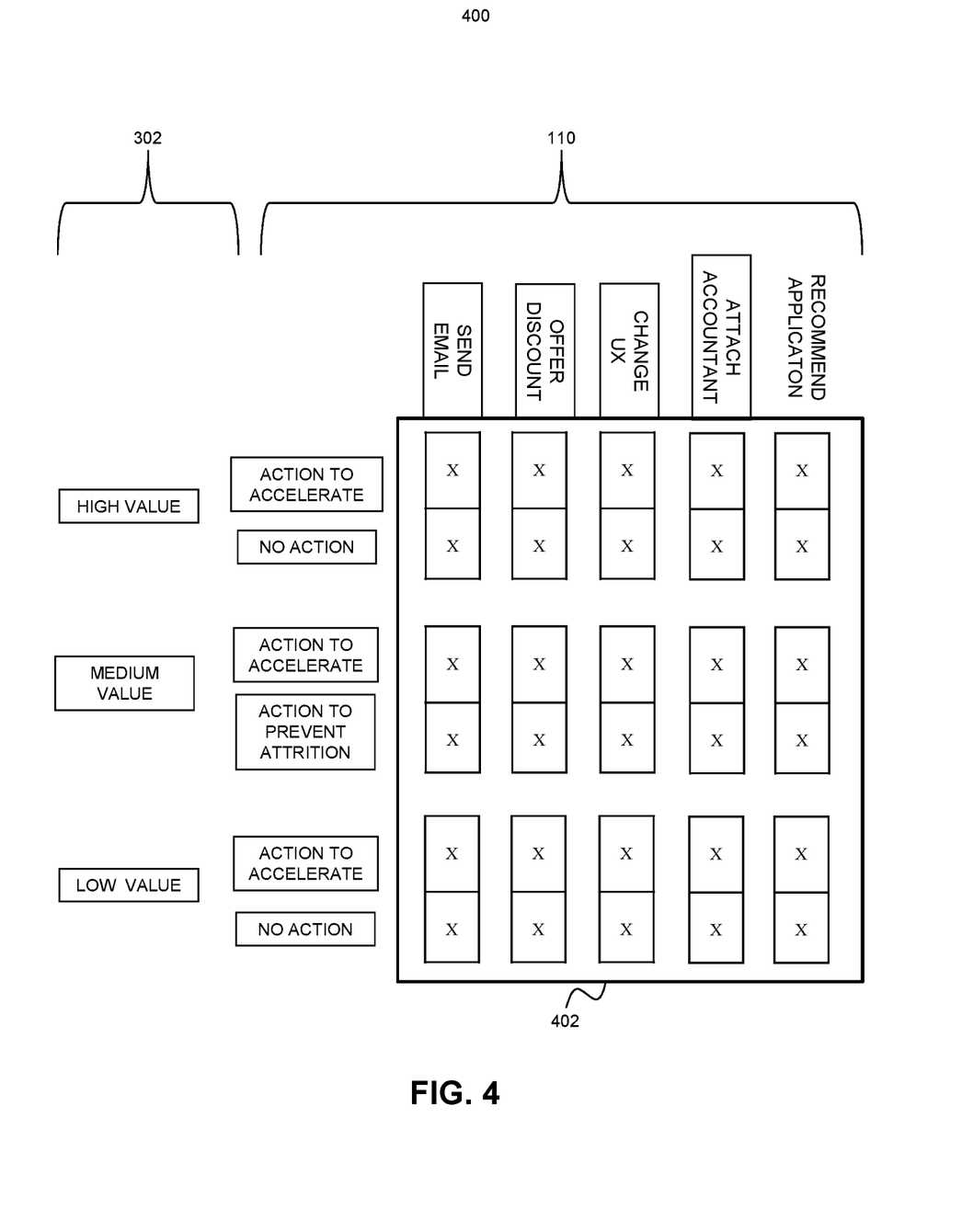
FIG. 4 is a representation of lifetime user prediction data and recommended user experience personalization data, in accordance with one embodiment.

FIG. 4 is a representation 400 of user lifetime value data 302 and recommended user experience personalization data 110, according to an embodiment. The user lifetime value data 302 and the recommended user experience personalization data 110 can be generated by any of the processes described in relation to FIGS. 1-3.

In the example of FIG. 4, the user lifetime value data 302 is categorical in nature, rather than monetary. The possible categories to which a user can be assigned includes high-value, medium value, and low value over the lifetime of the user. These categories represent the lifetime value of the user to the data management system. Additional or other categories can be used. The categories can be based on threshold monetary values.

In the example of FIG. 4, the recommended user experience personalization data is based, at least in part, on the user lifetime value data 302. Alternatively, the recommended user experience personalization data 110 can be based primarily on the output of the perturbation analyzer 210 discussed in relation to FIG. 2

The recommended user experience personalization data 110 can include multiple initial recommendation categories for the user. For example, if the user lifetime value data 302 indicates that the user is likely of a high value to the data management system, the initial recommendation categories can include selecting an action to accelerate our selecting no action. If the user lifetime value data 302 indicates that the user is medium value, the initial recommendation categories can include an action to accelerate conversion from a trial user to a paying user, or an action to prevent attrition of the paying user, i.e. an action to maintain the user as a paying user. If the user lifetime value data 302 indicates that the user is of low value to the data management system, then the initial recommendation categories can include an action to accelerate or no action.

In the example of FIG. 4, the recommended user experience personalization data 110 includes a recommended action matrix 402. The recommended action matrix 402 includes, as columns, possible actions. The rows of the recommended action matrix 402 correspond to the initial recommendation categories. The data value in a given data field indicate whether the action should be taken.

In the specific illustrative example of FIG. 4, the data management system is a bookkeeping system. The possible recommended actions include, among others, sending an email to the user, offering a discount to the user, changing a user experience or user interface of the data management system for the user, attaching a professional accountant to the user, or recommending a mobile or tablet application of the data management system to the user. In practice, the recommended action matrix 402 may include any other possible actions to be taken, such as phone contact or offering incentives.

For the initial recommendation categories corresponding to "no action", the recommended action the corresponding data values in the data fields of the recommended action matrix 402 with all indicate that the action should not be taken. For the other initial recommendation categories, the data fields for one or more of the possible recommended actions may include a data value indicating that the action should be taken.

Figure 5:
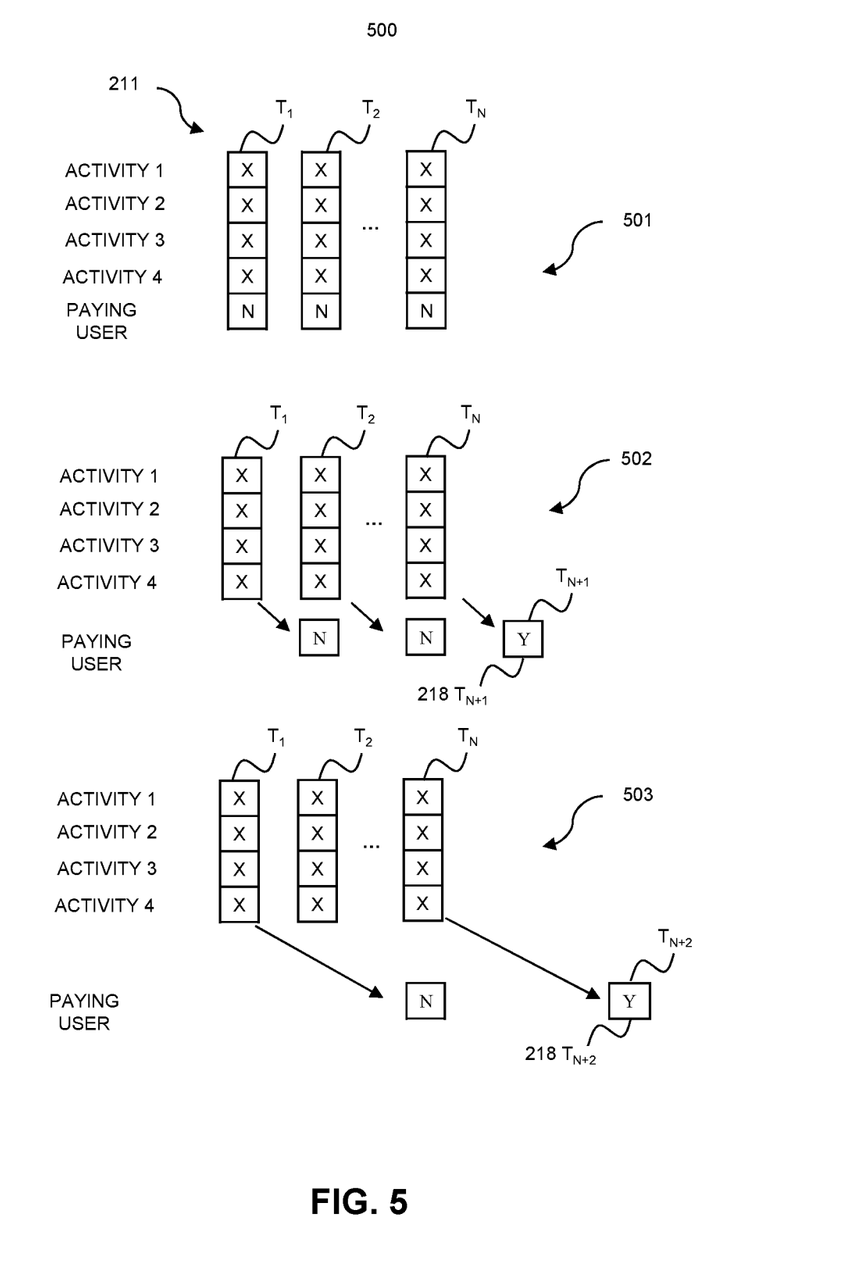
FIG. 5 is a representation of various data sets for predicting retention of users of a data management system, in accordance with one embodiment.

FIG. 5 is a representation 500 of three sets of data 501, 502, and 503. Data set 501 includes user activity vectors 211. Each user activity vector 211 corresponds to user actions or activities taken during respective time periods $T_1$-$T_N$. The first four data fields of the user activity vectors 211 correspond to activities 1-4. The final data field corresponds to whether the user was a paying user during the given time period. The user activity vectors 211 indicate that the user has not been a paying user in any of the time periods $T_1$-$T_N$.

Data set 502 illustrates a situation in which the analysis model 102 generates time period prediction data 218 for the future time period $T_{N+1}$. In this case, the analysis model has been trained to generate a retention or conversion prediction one time period in the future, or in other words, the period of time directly subsequent to the most recent period of time for which a user activity vector is included. The time period prediction data 218 can include a binary prediction, or a probability of retention or conversion.

Data set 503 illustrates a situation in which the analysis model 102 generates time period prediction data 218 for the future time period $T_{N+2}$. In this case, the analysis model has been trained to generate a retention or conversion prediction two time periods in the future. One of the benefits of the analysis model 102 described herein, is that the analysis model 102 can be trained to generate time period prediction data 218 for any future period of time.

The analysis model 102 can include a plurality of analysis models. Each analysis model is trained to predict user retention or conversion at a specific future time period N+1, N+2, N+3, etc. Each analysis model simultaneously analyzes the user activity vectors 211 and the static user data vector 212. The analysis models each output their respective time period prediction data to the survival analyzer 208. The survival analyzer generates the lifetime value prediction for the user based on the sum of all the time period predictions, or by performing other mathematical analysis on all of the time period predictions. Accordingly, the analysis model 102 can include a plurality of sub-models that each include a respective bidirectional long short-term memory 202, concatenator vector 216, and deep cross network 206 collectively trained to generate time period prediction data 218 for a selected future time period. These sub-models operate in parallel with each other and output their time period predictions to the survival analyzer 208. The survival analyzer 208 can make long term predictions based on all of the time period predictions.

Figure 6:
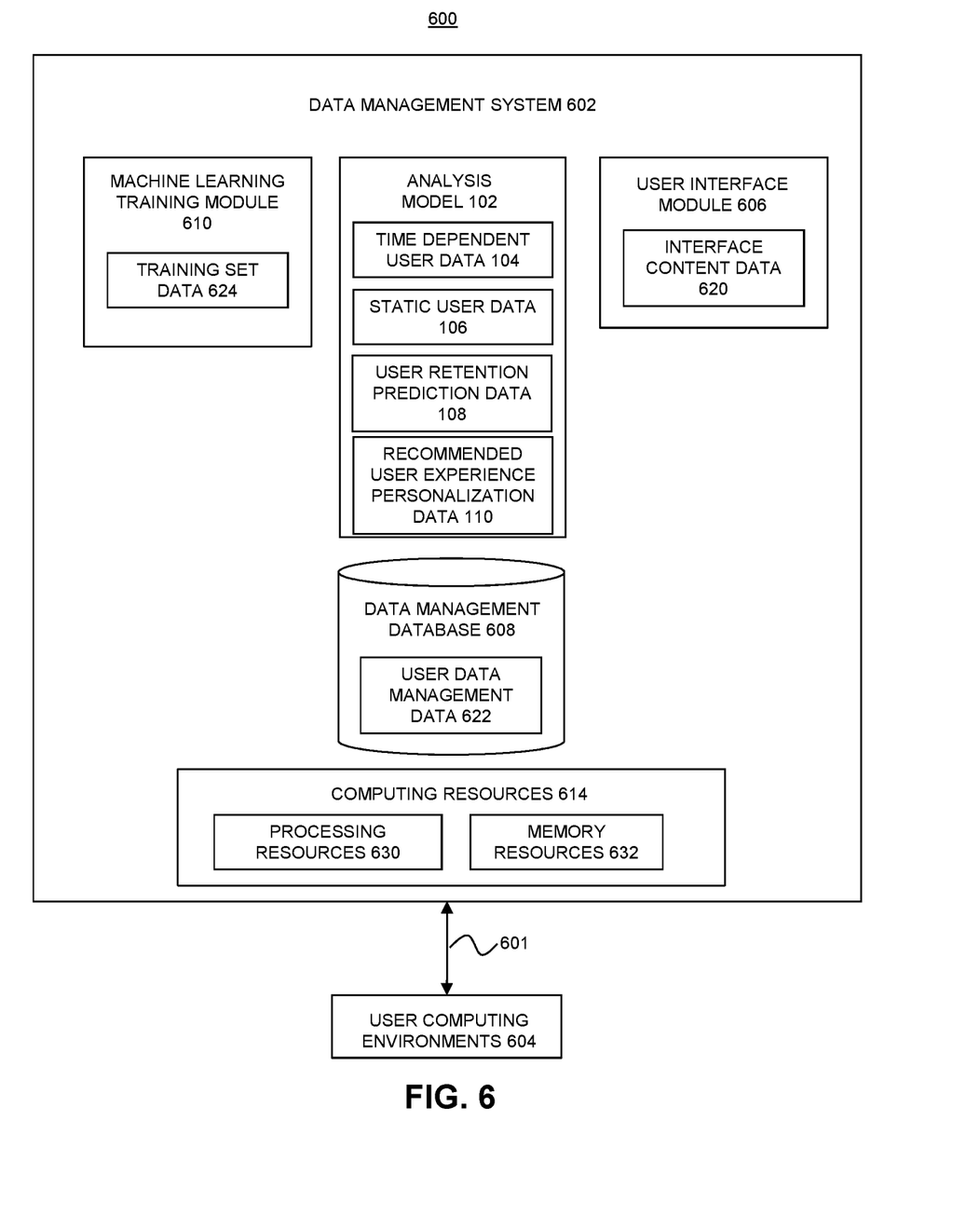
FIG. 6 is a block diagram of a data management system, in accordance with one embodiment.

FIG. 6 is a block diagram of a production environment 600 including a data management system 602, according to an embodiment. The data management system 602 is an electronic data management system that assists users to manage their data. The data management system 602 can include one or more of a bookkeeping system, a tax return preparation system, an accounting system, and a financial transaction monitoring system, according to various embodiments. Users provide their data to the data management system 602 and the data management system provides data management services to the users. The data management system 602 includes a user interface module 606, a user data management database 608, an analysis model 102, a machine learning training module 610, and computing resources 614.

The user computing environments 604 correspond to computing environments of the various users of the data management system 602. The users of the data management system 602 utilize the user computing environments 604 to interact with the data management system 602. The users of the data management system 602 can use the user computing environments 604 to provide data to the data management system 602 and to receive data and services, including data management services, from the data management system 602. The user computing environments 604 communicates with the data management system 602 via one or more communication networks 601.

The user interface module 606 enables the users to communicate with the data management system 602. The user interface module 606 provides interface content data 620 to assist the user in managing the user's data. The interface content data 620 can include navigation menus and other graphical user interface (GUI) tools that enable the user to navigate the data management system 602 in order to receive data management services. The interface content data 620 can include data management data related to the user. Thus, the user interface module 606 enables the data management system 602 to provide data management services to the user.

The user data management database 608 includes the user data management data 622. The user data management data 622 can include user data management data for all of the users of the data management system 602. Thus, the user data management database 608 can include a vast amount of data related to the data management services provided to users. In one embodiment, when the user utilizes the user interface module 606 to view interface content data 620, the interface content data 620 includes user data management data 622 related to the user as retrieved from the user data management database 608.

The data management system 602 utilizes the analysis model 102 to assist in determining whether users are likely to remain paying customers or become paying customers. As described previously in relation to FIGS. 1-5, the analysis model 102 receives time dependent user data 104 and static user data 106. The analysis model 102 generates user retention prediction data 108 and recommended user experience personalization data 110 based on the time dependent user data 104 and the static user data 106, as described previously in relation to FIGS. 1-5.

Before the analysis model 102 can generate the user retention prediction data 108 and the recommended user experience personalization data 110, the analysis model 102 is trained with one or more machine learning processes. The machine learning processes train the analysis model to understand the relationships between the elements of the user activity vectors 211 and the static user data vector 212 with respected predicting whether the user will remain or convert to a paying user.

The data management system 602 includes the machine learning training module 610 to train the analysis model 102. The machine learning training module 610 trains the analysis model 102 with one or more machine learning processes to generate the user retention prediction data 108 and the recommended user experience personalization data 110 based on the time dependent user data 104 and the static user data 106.

The machine learning training module 610 trains the analysis model 102 in a supervised machine learning process. The machine learning training module 610 utilizes training set data 624 to train the analysis model 102 with a supervised machine learning process.

The training set data 624 includes, for each of a plurality of historical users of the data management system 602, a respective set of historical user activity vectors. Each set of historical user activity vectors includes a respective vector for each of a plurality of time periods representing the activity of the historical user during that time period. The historical user activity vectors include the same data fields as the user activity vectors 211. The training set data 624 also includes, for each historical user, a static historical user vector. The static historical user vector includes data fields representing static characteristics of the historical user. The static historical user vector includes the same data fields as the static user data vector 212.

The training set data 624 also includes labels. The labels include, for each historical user, whether the historical user remainder became a paying user during a particular time. For example, if the training set data includes historical user activity vectors for time periods 1-N, and if the machine learning training module 610 is training the analysis model 102 to predict user retention or conversion at times N+1, N+2, etc., then the labels in the training set data 624 correspond to the known retention or conversions of the historical users at the time periods N+1, N+2, etc. The training set data 624 can include these labels because the data management system 602 retains such information about the historical users.

The machine learning training module 610 utilizes the training set data 624, including the labels, to train the analysis model 102 to generate the user retention prediction data 108 and the recommended user experience personalization data 110. The machine learning training process involves feeding the historical user activity vectors and the static historical user vectors through the analysis model 102. The analysis model 102 generates the time period prediction data 218 for each historical user for the selected future period of time. The time period prediction data 218 is compared to the labels. The error is calculated based on how accurate the predictions are compared to the labels. The analysis model 102 then makes adjustments to the nodes and relationships between the data values based on the calculated error. The historical user activity vectors and static historical user vectors are then fed to the analysis model 102 again. The analysis model 102 again compares the predictions to the labels and adjusts its internal parameters. This process is repeated in iterations until the analysis model 102 can consistently generate predictions that match the labels.

This training process enables the analysis model 102 to understand the complex relationships between the various components of the user activity vectors 211 and the static user data vectors 212. This enables the analysis model 102 to not only generate predictions for a user, but to also perturb the user activity vectors 211 to determine what actions might be taken to increase the probability that the user remains or becomes paying user.

In the example of FIG. 2 in which the analysis model 102 includes the bidirectional long short-term memory 202 and the deep cross network 206, the machine learning training process simultaneously trains the bidirectional long short-term memory 202 and the deep cross networks 206. Thus, the bidirectional long short-term memory 202 and the deep cross network 206 train simultaneously. In this sense the analysis model 102 is a single model, even though the analysis model includes many subcomponents, including sub models such as the bidirectional long short-term memory 202 and the deep cross networks 206. The sub models act as a single model trained with a single training process.

Because the deep cross network 206 includes a deep neural network and the cross-feature network, the supervised machine learning process is a supervised deep learning process. The supervised deep learning process trains the deep neural network of the deep cross network 206 to understand the relationships between all of the features of the user activity vectors 211 and the static user data vector 212. The deep learning process enables the deep cross network 206 to understand the sequential relationships in the sequences of the vectors representing the various time periods.

The data management system 602 includes computing resources 614. The computing resources 614 include processing resources 630 and memory resources 632. The processing resources 630 include one or more processors. The memory resources 632 include one or more memories configured as computer readable media capable of storing software instructions and other data. The processing resources 630 are capable of executing software instructions stored on the computer readable media. In one embodiment, the various components, modules, databases, and engines of the data management system utilize the computing resources 614 to assist in performing their various functions. Alternatively, or additionally, the various components, modules, databases, and engines can utilize other computing resources.

Herein, the analysis model 102 has been described as predicting whether users will remain paying users or will become paying users. The analysis model 102 is suitable for determining other types of interaction or relationship t to a data management system other than remaining or becoming a paying user. The analysis model 102 can predict retention or conversion as maintaining or creating a selected type of relationship with the data management system, not necessarily a paying relationship. Herein, attrition can be considered the converse of retention. If a user has a paying relationship, then the prediction of retention also corresponds to a prediction of attrition. In one example, if the analysis model 102 predicts an 80% probability of retention, then the analysis model 102 predicts a 20% probability of attrition.

Figure 7:
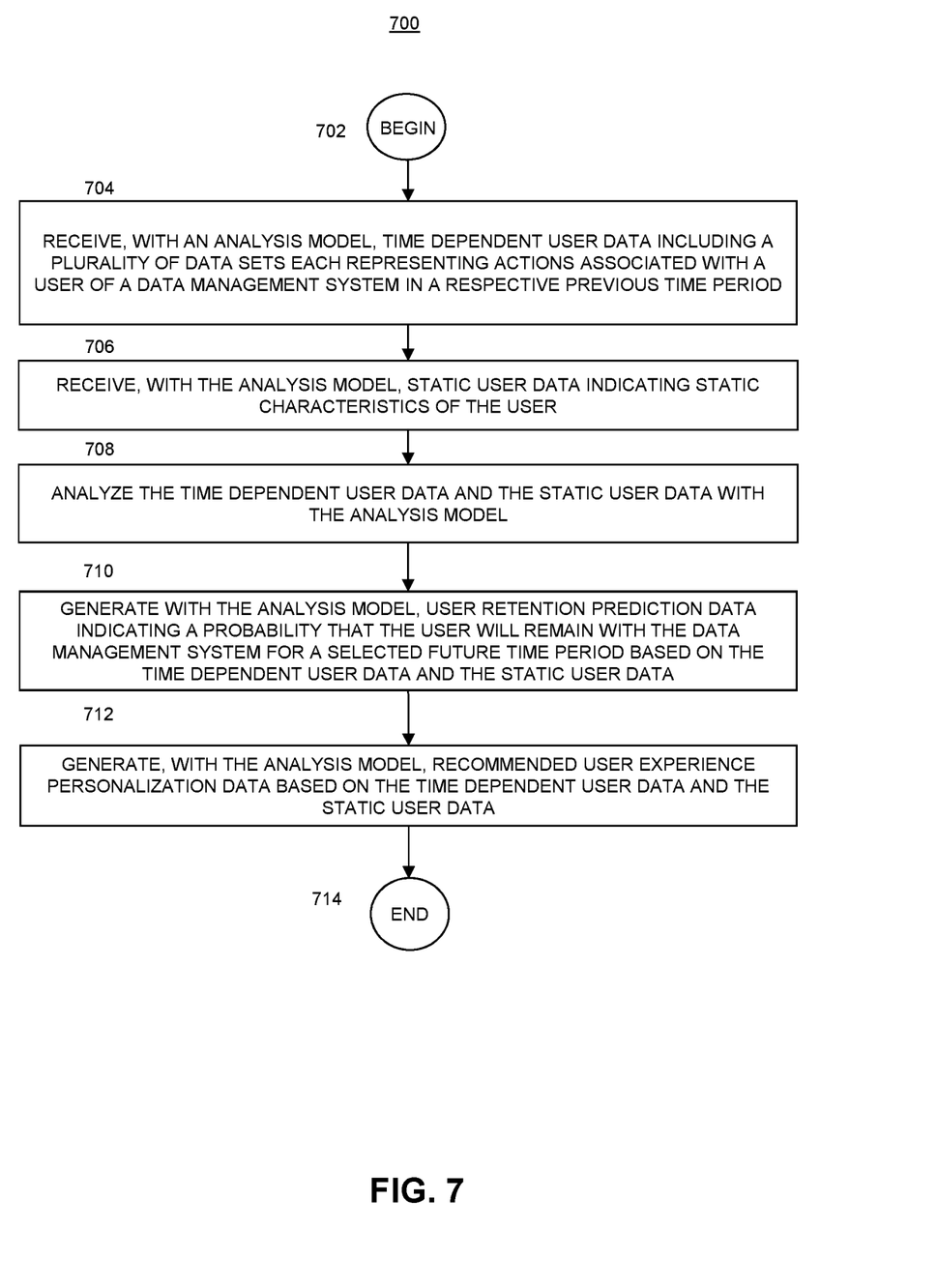
FIG. 7 is a flow diagram of a process for predicting retention of users of a data management system, in accordance with one embodiment.

FIG. 7 illustrates a flow diagram of a process 700.

Referring to FIG. 7, FIGS. 1-6, and the description of FIGS. 1-6 above, the process 700 begins at 702. From 702 process flow proceeds to 704.

At 704 time dependent user data is received, with an analysis model, including a plurality of data sets each representing actions associated with a user of a data management system in a respective previous time period. The time dependent user data is received using any of the methods, processes, and procedures discussed above with respect to FIGS. 1-6. From block 704 process flow proceeds to block 706.

At 706 static user data is received, with the analysis model, indicating static characteristics of the user. The static user data is received using any of the methods, processes, and procedures discussed above with respect to FIGS. 1-6. From 706 process flow proceeds to 708.

At 708 the time dependent user data and the static user data are analyzed with the analysis model, using any of the methods, processes, and procedures discussed above with respect to FIGS. 1-6. From 708 process flow proceeds to 710. From 708 process flow proceeds to 710.

At 710 user retention prediction data is generated, with the analysis model, indicating a probability that the user will remain with the data management system for a selected future time period based on the time dependent user data and the static user data. The user retention prediction data is generated using any of the methods, processes, and procedures discussed above with respect to FIGS. 1-6. From 710 process flow proceeds to 712.

At 712 recommended user experience personalization data is generated, with the analysis model, based on the time dependent user data and the static user data. The user experience personalization data is generated using any of the methods, processes, and procedures discussed above with respect to FIGS. 1-6. From 710 process flow proceeds to 714.

At 714 the process 700 is exited to await new data and/or instructions.

A system includes at least one processor and at least one memory coupled to the at least one processor, the at least one memory having stored therein instructions which, when executed by any set of the one or more processors, perform a process. The process includes passing time dependent user data to an analysis model, the time dependent user data including a plurality of data sets each representing actions associated with a user of a data management system in a respective previous time period, passing static user data to the analysis model indicating static characteristics of the user, and analyzing the time dependent user data and the static user data with the analysis model. The process includes generating, with the analysis model, user retention prediction data indicating a probability that the user will remain with the data management system at a selected future time period based on the time dependent user data and the static user data. The process includes generating, with the analysis model, recommended user experience personalization data based on the time dependent user data and the static user data. The process includes adjusting a user experience of the user based on the recommended user experience personalization data.

As noted above, the specific examples discussed above are but illustrative examples of implementations of embodiments of the method or process for generating a list of domain specific terms to assist in natural language processing of domain related text. Those of skill in the art will readily recognize that other implementations and embodiments are possible. Therefore, the discussion above should not be construed as a limitation on the claims provided below.

Generating user retention predictions and recommended actions to retain users based on time dependent user data and static user data is a technical solution to a long-standing technical problem and is not an abstract idea for at least a few reasons. First, generating user retention predictions and recommended actions to retain users based on time dependent user data and static user data is not an abstract idea because it is not merely an idea itself (e.g., can be performed mentally or using pen and paper). Second, generating user retention predictions and recommended actions to retain users based on time dependent user data and static user data is not an abstract idea because it is not a fundamental economic practice (e.g., is not merely creating a contractual relationship, hedging, mitigating a settlement risk, etc.). Third, generating user retention predictions and recommended actions to retain users based on time dependent user data and static user data is not an abstract idea because it is not a method of organizing human activity (e.g., managing a game of bingo). Fourth, although mathematics may be used in an analysis process the disclosed and claimed methods and systems of generating user retention predictions and recommended actions to retain users based on time dependent user data and static user data is not an abstract idea because the methods and systems are not simply a mathematical relationship/formula.

Generating user retention predictions and recommended actions to retain users based on time dependent user data and static user data yields significant improvement to the technical fields of electronic data management, user support, and data processing, according to one embodiment. The present disclosure adds significantly to the field of electronic data management because generating user retention predictions and recommended actions to retain users based on time dependent user data and static user data increases the efficiency and accuracy with which data management systems can provide data management services to users.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method comprising:
receiving, with an analysis model, time dependent user data including a plurality of data sets each representing actions associated with a user of a data management system in a respective previous time period;
receiving, with the analysis model, static user data indicating static characteristics of the user expected to remain the same for at least a period of time;
analyzing the plurality of data sets data and the static user data with the analysis model; and
generating, with the analysis model, user retention prediction data indicating a probability that the user will remain with the data management system for a selected future time period based on the plurality of data sets and the static user data.

2. The method of claim 1, wherein each data set of the time dependent user data is a user activity vector, and wherein the static user data is a static user vector.

3. The method of claim 2, further comprising processing the user activity vectors with a bidirectional long short-term memory of the analysis model.

4. The method of claim 3, further comprising generating, for each user activity vector, a respective dense vector with the bidirectional long short-term memory.

5. The method of claim 4, further comprising generating, for each dense vector, a respective concatenated vector by concatenating the dense vector with the static user data vector.

6. The method of claim 5, further comprising:
analyzing each concatenated vector with a deep cross network of the analysis model; and
generating the user retention prediction data with the deep cross network based on the analysis of the deep cross network.

7. The method of claim 6, further comprising generating at least a portion of the user retention prediction data with a survival analyzer of the analysis model, downstream from the deep cross network.

8. The method of claim 1, further comprising generating, with the analysis model, a recommended action to be taken by the data management system relative to the user based on analysis of the time dependent user data and the static user data.

9. The method of claim 8, wherein the recommended action is generated with a perturbation analyzer of the analysis model.

10. The method of claim 9, wherein generating the recommended action includes:
iteratively adjusting the time dependent user data;
generating adjusted user retention prediction data based on the adjusted time dependent user data;

identifying, based on the adjusted user retention prediction data, an adjustment that results in a retention probability for the user that is higher than a retention probability indicated by the user retention prediction data; and recommending an action to be taken by the data management system based on the identified adjustment.

11. A computing system implemented method comprising:

training an analysis model, with a machine learning process, to generate user retention prediction data and recommended user experience personalization data for users of a data management system;

receiving, with the analysis model after training the analysis model, time dependent user data including a plurality of user activity vectors each representing actions associated with a user of a data management system in a respective previous time period;

receiving, with the analysis model, a static user data vector indicating static characteristics of the user expected to remain the same for at least a period of time;

generating, with the analysis model, user retention prediction data indicating a probability that the user will remain with the data management system for a selected future time period based on the user activity vectors and the static user data vector; and generating, with the analysis model, recommended user experience personalization data for the user based on the user activity vectors and the static user data vector.

12. The method of claim 11, wherein the recommended user experience personalization data recommends an action to be taken by the data management system to personalize the data management system for the user.

13. The method of claim 12, further comprising taking the recommended action with the data management system.

14. The method of claim 11, wherein generating the recommended user experience personalization data is based on perturbations to the user activity vectors by the analysis model.

15. The method of claim 11, wherein the machine learning process includes utilizing a training set of historical user activity vectors and labels indicating whether historical users were retained by the data management system in time periods succeeding time periods associated with the historical user activity vectors.

16. The method of claim 11, wherein the machine learning process includes a deep learning process.

17. The method of claim 11, wherein the analysis model includes a deep cross network having a deep neural network and a cross-feature network in parallel with each other.

18. A system comprising:

one or more processor; and at least one memory coupled to the one or more processors and storing, instructions that, when executed by the one or more processors, cause the system to perform operations including:

receiving, with an analysis model, time dependent user data including a plurality of data sets each representing actions associated with a user of a data management system in a respective previous time period;

receiving, with the analysis model, static user data indicating static characteristics of the user expected to remain the same for at least a period of time;

analyzing the time dependent user data and the static user data with the analysis model;

generating, with the analysis model, user retention prediction data indicating a probability that the user will remain with the data management system at a selected future time period based on the time dependent user data and the static user data; and generating, with the analysis model, recommended user experience personalization data based on the time dependent user data and the static user data.

19. The system of claim 18, wherein execution of the instructions causes the system to perform operations further including training the analysis model, with a machine learning process, to generate the user retention prediction data and recommended user experience personalization data for users of the data management system.

20. The system of claim 19, wherein the machine learning process includes a deep learning process.

* * * * *